United States Patent
Torsner et al.

(10) Patent No.: US 9,166,733 B2
(45) Date of Patent: *Oct. 20, 2015

(54) ADAPTIVE (RLC) SEGMENTATION

(71) Applicant: Telefonaktiebolaget L M Ericsson (publ), Stockholm (SE)

(72) Inventors: Johan Torsner, Masaby (FI); Mats Sågfors, Kyrkslätt (FI)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/509,359

(22) Filed: Oct. 8, 2014

(65) Prior Publication Data

US 2015/0023373 A1    Jan. 22, 2015

Related U.S. Application Data

(63) Continuation of application No. 13/477,255, filed on May 22, 2012, now Pat. No. 8,964,784, which is a continuation of application No. 12/278,649, filed as application No. PCT/SE2007/050061 on Feb. 5, 2007, now Pat. No. 8,331,403.

(60) Provisional application No. 60/743,241, filed on Feb. 7, 2006.

(51) Int. Cl.
*H04J 3/24* (2006.01)
*H04L 1/00* (2006.01)

(52) U.S. Cl.
CPC ............ *H04L 1/0007* (2013.01); *H04L 1/0015* (2013.01)

(58) Field of Classification Search
None
See application file for complete search history.

(56) References Cited

U.S. PATENT DOCUMENTS 7,206,295 B2   4/2007  Seguin
8,331,403 B2 * 12/2012 Torsner et al. ............ 370/474

(Continued)

FOREIGN PATENT DOCUMENTS

EP   1211868 A2   6/2002
EP   1487161 A1   12/2004

(Continued)

OTHER PUBLICATIONS

Panasonic. "LTE-Segmentation and concatenation proposal." 3GPP TSG RAN2 #50, R2-060011, Jan. 9-13, 2006, Sophia Antipolis, France, pp. 1-6.

(Continued)

*Primary Examiner* — Anh-Vu Ly
(74) *Attorney, Agent, or Firm* — Coats & Bennett, P.L.L.C.

(57) ABSTRACT

A method and nodes for providing adaptive segmentation in a higher protocol layer interacting with a lower protocol layer. An adaptable segmentation limit, defining a threshold of a largest Protocol Data Unit (PDU) that is to be submitted to a lower protocol layer, is deployed at a higher protocol layer interacting with the lower protocol layer. A PDU to be submitted to the lower protocol layer may match any transport block size that is available in the lower protocol layer. For each Service Data Unit (SDU) arriving at the higher protocol layer, it is determined if the respective SDU can fit into the segmentation limit or not. Each SDU that do not fit into the segmentation limit is segmented into PDUs which are smaller than or equal to the segmentation limit, while no segmentation is performed on SDUs that fit into the segmentation limit.

22 Claims, 6 Drawing Sheets

(56) References Cited

U.S. PATENT DOCUMENTS

| | | |
|---|---|---|
| 8,964,784 B2 * | 2/2015 | Torsner et al. ................ 370/474 |
| 2001/0015956 A1 | 8/2001 | Ono |
| 2002/0001314 A1 | 1/2002 | Yi et al. |
| 2003/0093739 A1 | 5/2003 | Han |
| 2003/0185193 A1 | 10/2003 | Choi et al. |
| 2004/0153896 A1 | 8/2004 | Jang et al. |
| 2005/0147040 A1 | 7/2005 | Vayanos et al. |
| 2007/0171857 A1 | 7/2007 | Wang et al. |
| 2011/0032877 A1 | 2/2011 | Pani et al. |

FOREIGN PATENT DOCUMENTS

| | | |
|---|---|---|
| EP | 1764980 A1 | 3/2007 |
| WO | 2006117613 A1 | 11/2006 |

OTHER PUBLICATIONS

Ericsson. "User plane protocol enhancements." TSG-RAN WG2 Meeting #48bis, Tdoc R2-052508, Cannes, France, Oct. 10-14, 2005, pp. 1-4.

* cited by examiner

ADAPTIVE (RLC) SEGMENTATION

RELATED APPLICATIONS

This application is a continuation of U.S. application Ser. No. 13/477,255, filed 22 May 2012, which is a continuation of U.S. application Ser. No. 12/278,649, filed 7 Aug. 2008, which is a national stage application of PCT/SE2007/050061, filed 5 Feb. 2007, which claims benefit of U.S. Provisional Application 60/743,241, filed 7 Feb. 2006, the disclosures of each of which are incorporated herein by reference in their entirety.

TECHNICAL FIELD

The present disclosure relates generally to the field of segmentation and concatenation of Service Data Units (SDUs) into Protocol Data Units (PDUs) in a higher protocol layer, and more particularly of reducing the overhead due to segmentation and/or concatenation.

BACKGROUND

In the Universal Mobile Telecommunications System (UMTS) a general protocol reference model containing a layered protocol stack is used for providing reliable communication of user data and signaling between the nodes of the network. UMTS also employs the concept of control-plane and user-plane, where the control-plane is a set of protocols used exclusively for control signaling purposes, while the user-plane is used exclusively for user data transfer.

Figure 1:
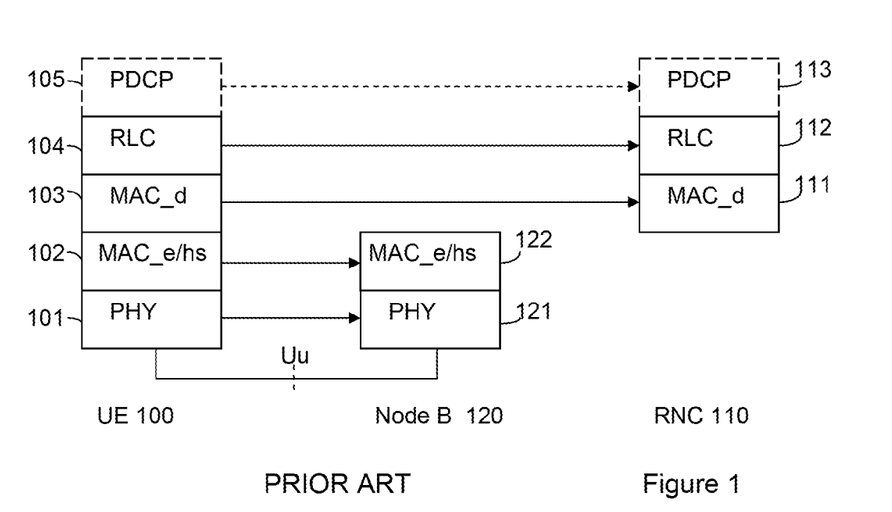
FIG. 1 is a basic overview of a procedure, according to the prior art.

A user-plane protocol stack in UTRAN according to the prior art is illustrated in FIG. 1. The figure illustrates the protocol stack of a User Equipment (UE) 100 communicating with a Serving Radio network Controller (SRNC) 110 and an intermediate Node B 120. The Physical layer (PHY) 101, 121 offers services to the Medium Access (MAC) layers via transport channels, while the MAC layers (MAC_e/hs/d) 102, 103, 111, 122, in turn, offers services to the Radio Link Control (RLC) layer 104, 112 by means of logical channels. MAC-d handles dedicated channels, which may be mapped to common transport channels, wherein MAC-d passes data to MAC-hs or MAC-e. MAC-hs denotes the downlink MAC entity and is used for serving the High Speed Downlink Shared Channel (HS-DSCH), introduced in Release 5 of the 3GPP specification, while MAC-e denotes a MAC entity related to the new uplink channel, Enhanced Dedicated Channel (E-DCH), introduced in Release 6.

In the user-plane, which is illustrated by the figure, the RLC layer offers services to the Packet Data Convergence Protocol (PDCP) 105, 113. A control-plane may be illustrated by simply changing the PDCP layer to a Radio Resource Control (RRC) layer.

A Service Data Unit (SDU) can be conceptualized as a data unit received from, or submitted to, a higher protocol layer, e.g. RLC. A Protocol Data Unit (PDU) is a unit which is submitted to, or received from, a protocol layer logically located beneath the protocol from which the SDU is received. The PDU comprises a mandatory header and, optionally also a Length Indicator (LI), which indicates the last octet of each higher-layer SDU, ending within the PDU. The PDU also comprises a data field, containing one or more segments from one or more higher-layer PDUs.

The RLC protocol provides radio bearers for user data transfer and signaling radio bearers for control signaling and includes functionality such as RLC segmentation, re-assembly, and potentially also concatenation of RLC SDUs into RLC PDUs. At the transmitting end, segmentation and/or concatenation is used in order to match currently used Transport Formats (TF), i.e. predetermined PDU sizes. In the receiving end the segments belonging to one higher-layer PDU are re-assembled before they are delivered to the higher-layer. An RLC SDU is typically an IP Packet or a signaling message, while an RLC PDU typically is a MAC_d SDU. If a higher-layer PDU segment does not completely fill the payload field of the RLC PDU, the first segment in the next higher-layer PDU may be put in the RLC PDU in concatenation with the last segments of the previous higher-layer PDU.

The RLC protocol includes the three different modes Transparent Mode (TM), Unacknowledged Mode (UM) and Acknowledged Mode (AM). In AM, the RLC deploys re-transmission to guarantee lossless delivery of all RLC PDUs, while no re-transmission, and, hence, no guarantee of data delivery is deployed in UM. In TM, no protocol overhead is added by the RLC layer. The present disclosure is applicable to the UM and AM modes.

Both UM and AM of RLC uses segmentation and optionally concatenation on the transmitter side, while re-assembly is used on the receiver side.

In the current UTRAN architecture, the RLC protocol is terminated in the Serving Radio Network Controller (SRNC) and in the User Equipment (UE), respectively. The present disclosure does, however, not preclude a different architecture, where the terminating point of the protocol deploying segmentation, re-assembly and concatenation is placed elsewhere, e.g. in the base station (node B). The RLC PDUs are submitted to, and received from, the Medium Access Control (MAC) protocol, which realizes the transport channels over the UMTS air-interface, the Uu interface.

In the existing UTRAN protocol stack, the RLC PDU size for a given radio bearer can only take a discrete number of different sizes, which are configurable by upper layers of the protocol stack. For RLC AM, the RLC PDU size can only take a single value. The most commonly used RLC PDU size for user-plane transmissions is 320 bits of payload and a 16 bits RLC header. It can be configured and re-configured by higher-layers, and bearers carrying signaling typically deploy a PDU size, carrying 128 bits of payload.

For RLC UM, there is a possibility to configure several RLC PCU sizes. The header fields in MAC-hs and MAC-e, however, restrict the de-facto numbers of different sizes that can be used. For example, it is currently possible to use maximally eight different MAC-d PDU sizes over HS-DSCH, where a MAC-d PDU is an RLC PDU and an optional MAC-d header.

The fact that the RLC PDU size can only take one single size, or a discrete set of sizes, means that RLC SDUs typically need to be segmented and/or concatenated into an appropriate number of RLC PDUs. One drawback with such a limitation can be extensive protocol overhead and padding. Padding occurs if concatenation cannot be used, i.e. the remaining payload to be segmented into an RLC PDU does not fill the available space of the most suitable RLC PDU size. Such a situation can be illustrated with the two following examples.

In a first example we consider the transmission of one 1500 octet IP packet. It is assumed that an RLC PDU size of 320 bits, i.e. 40 octets, is used for segmentation. This implies that the IP packet is segmented into 38 RLC PDUs, having the capacity of delivering 1520 octets.

In this case, the RLC header overhead equals 38*2 octets and a one octet length indicator, inserted in the last RLC PDU, which makes a total of 77 octets, while padding, which is used to fill up the last RLC PDU, equals 19 octets. This means that for the transmission of 1500 octets, a total RLC overhead of 96 octets will be necessary.

In a second example, the transmission of one compressed Transport Communication Protocol Acknowledgement (TCP ACK) is considered. A TCP ACK is typically 40 bytes long. In this example it is assumed that a TCP ACK is compressed down to four octets by a conventional header compression protocol. The RLC protocol adds a two octet fixed header and a one octet length indicator and adds padding up to the full RLC PDU size. With the typical RLC PDU size of 320 bits, this implies a 38 octet header overhead and padding for transmission of just four octets of payload.

The first example clearly illustrates the deficiency of using fixed RLC PDUs when segmenting and/or concatenating large RLC SDUs, while the second example shows the inefficiency which may occur when segmenting and/or concatenating small RLC SDUs.

To overcome the problems mentioned above, an RLC protocol that is able to use any RLC PDU size has been proposed in R2-052508 "User plane protocol enhancements", presented at TSG-RAN WG2 Meeting #48bis, Cannes, France, 10-14 Oct. 2005. Such a flexible RLC solution may allow arbitrary RLC PDU sizes, such that the RLC PDU equals the size of the RLC SDU and the necessary RLC header, and may also provide a minimal level of RLC overhead. In addition, such a solution may remove the need for padding. In the first example, mentioned above, the required overhead with the solution proposed in R2-052508 "User plane protocol enhancements", would be 2 octets, as opposed to 96 octets. In both examples, the padding would be zero octets, as opposed to 19 and 38 in the first and second example, respectively.

Still, a problem of handling large RLC SDUs, i.e. large IP packets or long signaling messages may occur also when using the solution referred to in R2-052508, especially when transmission coverage and RLC AM re-transmission efficiency is considered.

This deficiency can be illustrated in a first scenario, wherein a large SDU PDU of 1500 octets is forwarded to the MAC protocol as a single RLC PDU, without deploying any segmentation. The transmission of the RLC PDU in a single transport block in MAC-hs or in MAC-e may lead to coverage problems, i.e. a sufficiently large transport block may not be supported in the whole cell, which may result in a failure to deliver the large RLC PDU. In other words, if the link quality between a user equipment and a radio base-station is bad, the MAC protocol may fail to deliver such a large block as a single transmission unit. Trying to solve the scenario described above by adapting the transmission blocks size to the link-quality by introducing segmentation and concatenation into MAC, may not be adequate, since such a solution may result in a low RLC AM re-transmission efficiency. Considering once again the first example, described above, assuming that MAC-hs segments the IP-packet into 38 transport blocks. Hybrid Automatic Repeat Request (HARQ) is an advanced retransmission strategy, which allows the performing of possible re-transmissions directly at the physical/MAC layer. This is done without involving higher-layer mechanisms and so reduces the delay.

Due to an error in the HARQ feedback signaling or an error caused by the reaching of the maximum number of HARQ re-transmissions, all but one of the respective transmission blocks may be successfully delivered. In such a case, the whole RLC PDU of a 1500 octet and an RLC header has to be re-transmitted, resulting in a very low RLC re-transmission efficiency.

Despite the obvious performance benefits gained from using a flexible RLC according to the prior art, the scenario described above clearly illustrates that there are situations when large RLC PDUs can create problems, which typically occur at times of bad link quality, or when there are not enough of transmission resources in terms of power, spectrum or time-slots available.

SUMMARY

The object of the present disclosure is to address at least some of the problems outlined above. More specifically, the present disclosure solves the aforementioned problems by providing and implementing an adaptive segmentation limit according to the independent claims described below.

An adaptable segmentation limit, defining a threshold of a largest Protocol Data Unit (PDU) that is submitted to a lower protocol layer, is deployed at a higher protocol layer interacting with the lower protocol layer. A PDU to be submitted to the lower protocol layer may match any transport block size that is available in the lower protocol layer. For each Service Data Unit (SDU) arriving at the higher protocol layer, it is determined if the respective SDU can fit into the segmentation limit or not. Each SDU that do not fit into the segmentation limit is segmented into PDUs which are smaller than or equal to the segmentation limit, while no segmentation is performed on SDUs that fit into the segmentation limit. The resulting PDU or PDUs are then submitted to the lower protocol layer.

SDUs that remain after a segmentation or when no segmentation is found necessary may be concatenated if concatenation is supported.

The suggested adaptive segmentation may be executed using any of a number of alternative conditions, either alone or in a combination. One or more PDUs may be set to the same size as the segmentation limit. PDUs may match either the largest, or any transport block size that is available in the lower protocol layer. PDUs may also be set to equal size if perfect division into PDUs of equal size is possible, or to approximately equal size if perfect division is not possible.

The segmentation limit may be dynamically adapted on the basis of an indication, signaled from the lower protocol layer, including a notification, denoted the PDU size limit, of the largest PDU size which is accepted by the lower protocol layer. The indication may be updated and signaled to the higher protocol layer according to one or more alternative conditions. A change of the PDU size limit to a level, lower than a predefined updating threshold may define one way of triggering signaling of an indication. Unsuccessful delivering of PDUs from the lower protocol layer to a receiving peer may also trigger signaling of an indication from the lower protocol layer to the higher protocol layer. The indication may also include a request for re-segmentation or to discard one or more SDUs.

The PDU size limit may be updated periodically or on the basis of one or more monitored parameters, such as available or unblocked transport blocks, link quality, available scheduling grants or available resources.

Alternatively, or in a combination, the segmentation limit may be adjusted on the basis of the residual loss-rate, observed in the higher protocol layer. After having compared the observed loss-rate to a loss-rate threshold, the segmentation limit is adjusted by a predetermined amount. The observation may be executed periodically or according to any other predetermined condition.

Under favorable conditions, such as, e.g. high link quality, the proposed adaptive segmentation may be considered superfluous. Under those circumstances the PDU limit may be set to a predetermined, relatively large size, which is signaled to the higher protocol layer. Since all SDUs will now fit into the segmentation limit, segmentation will be cancelled until the segmentation limit is updated with a lower value.

A node is adapted to provide adaptive segmentation in a higher protocol layer interacting with a lower protocol layer which comprises: means for deploying an adaptable segmentation limit the higher protocol layer, defining a threshold of the largest PDU to be submitted to a lower protocol layer; means for receiving one or more SDUs by the higher protocol layer; means for determining for each SDU if the SDU can fit into the segmentation limit or not; means for segmenting an SDU that do not fit into the segmentation limit, into PDUs which are smaller than or equal to the segmentation limit, or performing no segmentation on an SDU that fit into the segmentation limit, and; means for submitting the resulting PDU/PDUs to the lower protocol layer. The segmenting means of the node may be adapted to perform concatenation according to the following rules:

concatenating remaining SDUs into a PDU, which fit into the segmentation limit, after having segmented one or more SDUs, or, in case no segmentation is being performed; concatenating two or more SDUs into a PDU until the segmentation limit is reached.

Another node to be used in a communication network, providing adaptive segmentation in a higher protocol layer interacting with a lower protocol layer of said node comprises the following means: means for adjusting a PDU size limit, defining the largest PDU size which is accepted by the lower protocol layer; means for signaling an indication, including a notification of the PDU size limit to the higher protocol layer, to be used when adaptively adjusting a segmentation limit, defining a threshold of a largest PDU that is submitted to the lower protocol layer; means for receiving one or more PDUs, submitted from said higher protocol layer.

The higher protocol layer may be e.g. the RLC protocol layer, and the protocol may be located in a node such as e.g. an RNC, node B or a user equipment. The lower protocol layer may be e.g. the MAC protocol layer, which may be located in another node, e.g. a node B or a user equipment, interacting with the node comprising the higher protocol layer.

BRIEF DESCRIPTION OF THE DRAWINGS

The present disclosure will now be described in more detail by means of exemplary embodiments and with reference to the accompanying drawings, in which.

DETAILED DESCRIPTION

Briefly described, the present disclosure provides a method and nodes in a communication network which are adapted for providing adaptive segmentation and concatenation.

According to the claimed invention, adaptive segmentation and/or concatenation is provided by way of introducing an adaptively adjustable segmentation limit to be deployed in a higher protocol layer, which is responsible for segmentation and/or concatenation. The higher protocol layer in question may be located in any type of node, adapted to perform segmentation and/or concatenation, such as, e.g. an RNC, a node B or a user equipment. The segmentation limit according to the claimed invention defines a threshold of the largest PDU that is to be submitted to a lower protocol layer by a higher protocol layer sender, deploying segmentation and/or concatenation. The lower protocol layer may be located in, e.g. a node B, a user equipment or any other node to which one or more PDUs are submitted from a higher protocol layer.

Figure 2A:
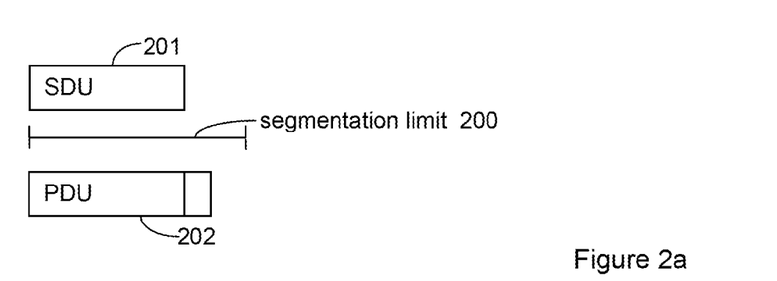
FIG. 2a is an illustration of an evaluation situation where an SDU is smaller than a specified segmentation limit, in accordance with one embodiment.
Figure 2B:
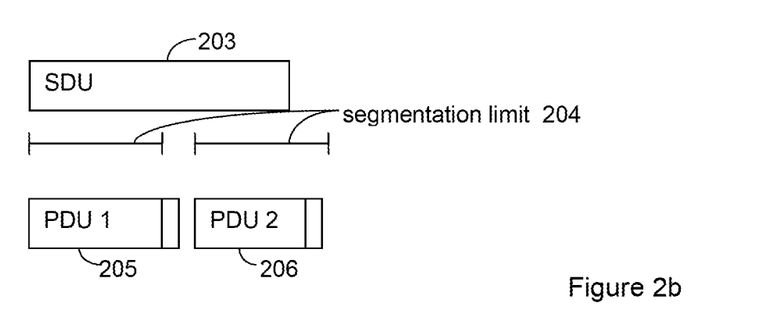
FIG. 2b is an illustration of another situation in which an SDU is larger than a specified segmentation limit, in accordance with another embodiment.

FIG. 2a shows one possible scenario in which a segmentation limit 200 has been deployed. The SDU 201 is found to fit into an approved PDU format, i.e. the size of the resulting PDU does not exceed the largest acceptable PDU size, denoted the PDU size limit. When this condition is met, a header will be attached to the SDU, and the resulting PDU 202, will be submitted from the protocol sender to a lower protocol layer, without performing any segmentation or concatenation in the higher protocol layer. In the scenario described by FIG. 2b, however, the size of the SDU 203 is found to be too large to fit into one PDU of acceptable size, i.e. the SDU is larger than the segmentation limit 204. In this case, the SDU needs to be segmented, such that the sizes of each resulting PDU 205 and 206 is less than or equal to the segmentation limit. In the figure, the first PDU, PDU 1, equals the size of the segmentation limit, while the size of the second PDU, PDU 2 is smaller than the segmentation limit.

One embodiment for using the proposed segmentation limit according to one embodiment will now be described with reference to FIG. 3.

Figure 3:
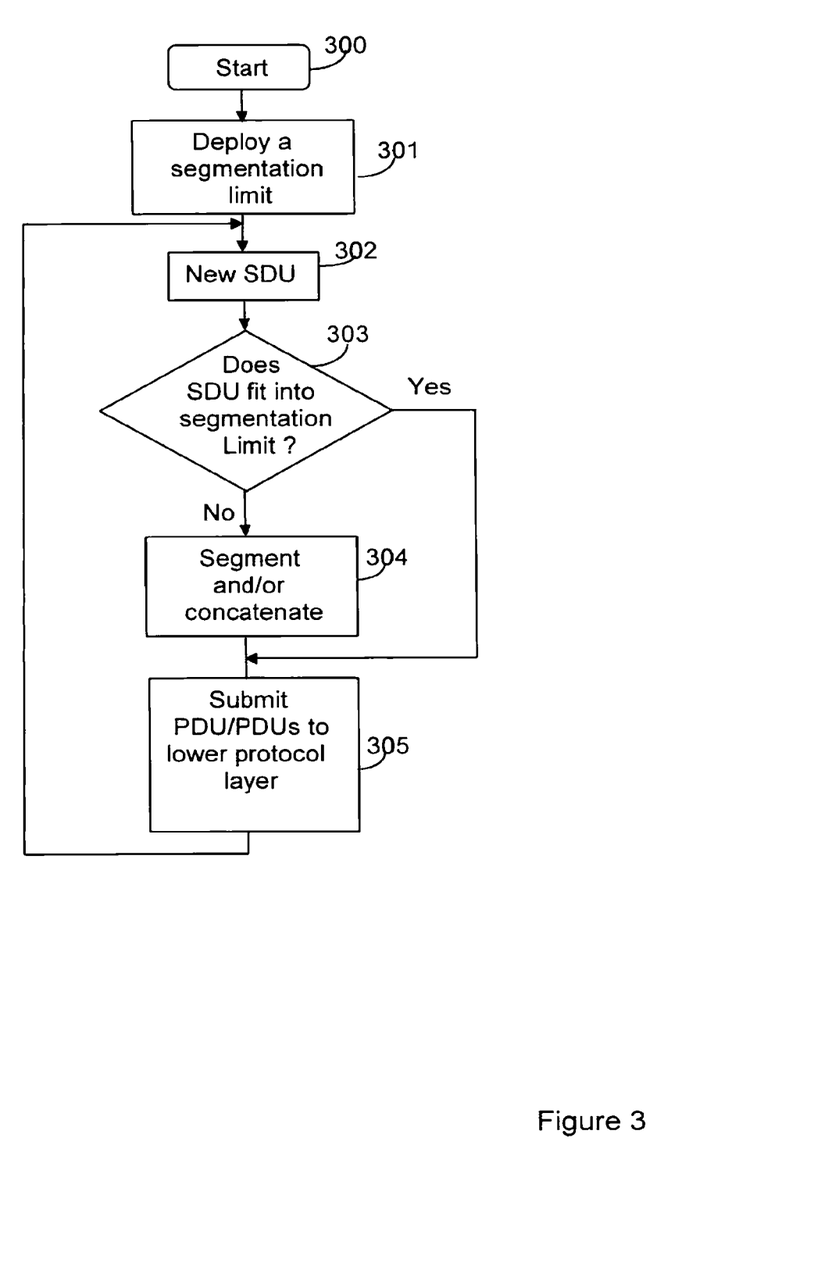
FIG. 3 is a flow chart illustrating a basic procedure for deploying a segmentation limit in accordance with another embodiment.

FIG. 3 illustrates one way of providing adaptive segmentation and/or concatenation by way of using a segmentation limit, starting at step 300. At a next step 301, the adaptively adjustable segmentation limit is deployed in a higher protocol layer responsible for performing segmentation and/or concatenation. Initially the segmentation limit is set to a starting value, according to one or more predetermined conditions. Alternative embodiments for adjusting the segmentation limit will be described below with reference to FIGS. 4a and 4b.

Arriving SDUs, illustrated by step 302, to be submitted from a higher protocol layer to a lower protocol layer as one or more PDUs, are compared to the segmentation limit in a next step 303, where it is determined whether an SDU will fit into the segmentation limit or not. If the SDU is found not to fit into the segmentation limit, the SDU is segmented into PDUs which are smaller than or equal to the segmentation limit in step 304, before the resulting PDUs are submitted to a lower protocol layer in step 305. If, however, an SDU is found to fit into the segmentation limit, the resulting PDU is submitted without performing any segmentation. The described procedure is repeated for each arriving SDU as long as the segmentation limit is deployed by the system. If supported, the SDUs may be concatenated, either in combination with segmentation or without using segmentation. SDUs which remain after a segmentation may be concatenated into a PDU, which fit into the segmentation limit. If no segmentation is being performed, two or more SDUs may be concatenated into a PDU until the segmentation limit is reached and no more SDU will fit into the PDU.

The segmentation which is performed in step 304 may be done according to one or more predefined rules, some of which will now be described.

According to a first embodiment, an SDU is segmented and/or concatenated into PDUs in such a way that the size of at least one PDU is equal to the segmentation limit. In another embodiment, an SDU is segmented and/or concatenated into equally sized PDUs which fit into the segmentation limit. If, however, no division into equally sized PDUs is possible, the respective SDU may instead be segmented and/or concatenated into PDUs of approximately equal size. In yet another embodiment, an SDU may be segmented and/or concatenated into PDUs which match any available transport block sizes in MAC, or, alternatively, the largest available transport block.

Figure 4A:
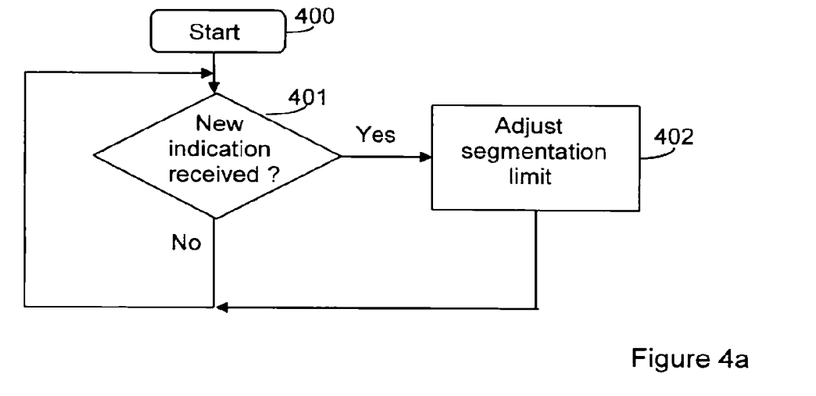
FIG. 4a is a flow chart illustrating a procedure for adaptively adjusting a segmentation limit in a higher protocol layer in accordance with another embodiment.

In FIG. 4a one embodiment for adjusting the segmentation limit is described. The procedure, starting in step 400, is being executed in the higher protocol layer which is responsible for segmentation and/or concatenation. One way of providing adjustment of the segmentation limit is to indicate the largest PDU size to be accepted by a lower protocol layer, to which one or more PDUs are to be submitted. This indication will include a notification of the largest acceptable PDU size, hereby defined as the PDU size limit. The PDU size limit is adjusted in the lower protocol layer according to predetermined adjusting conditions and is also signaled to the higher protocol layer according to predetermined signaling conditions. In FIG. 4a, a check for a new indication, comprising the proposed PDU size limit, is executed in step 401. Such a checking procedure may be executed periodically or according to one or more alternative conditions. When an indication is received at the higher protocol layer, the segmentation limit is adjusted, taking the received PDU size limit into consideration. The adjustment, which is executed in step 402, is done according to one or more predetermined conditions.

Figure 4B:
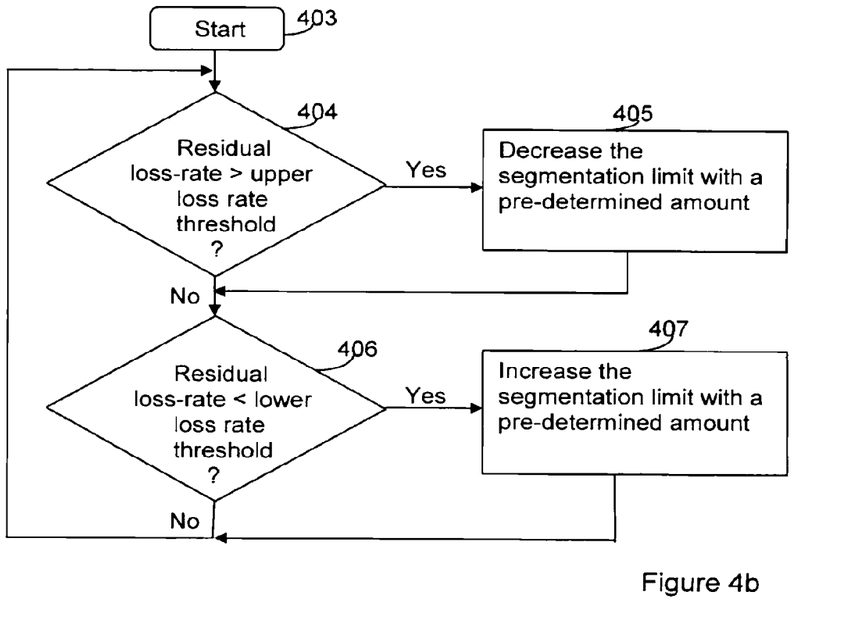
FIG. 4b is a flow chart illustrating an alternative procedure for adaptively adjusting a segmentation limit in a higher protocol layer in accordance with yet another embodiment.

An alternative way of adjusting the segmentation limit will now be describe with reference to FIG. 4b. This alternative embodiment, which starts at step 403, refers to an updating procedure which is executed in the higher protocol layer, responsible for segmentation and concatenation. An observed residual loss-rate, which may be monitored periodically, is compared to an upper loss-rate threshold in step 404. If the loss-rate is found to be higher than the upper loss-rate threshold, the segmentation limit is decreased with a pre-determined amount in step 405.

In a next step 406 the loss rate is compared to a lower loss-rate threshold. If the residual loss-rate is found to be below the lower loss-rate threshold, the segmentation limit is instead increased with a pre-determined amount in step 407. It is to be understood that the two alternative embodiments described with reference to FIGS. 4a and 4b may be implemented separately or in a combination.

Figure 5A:
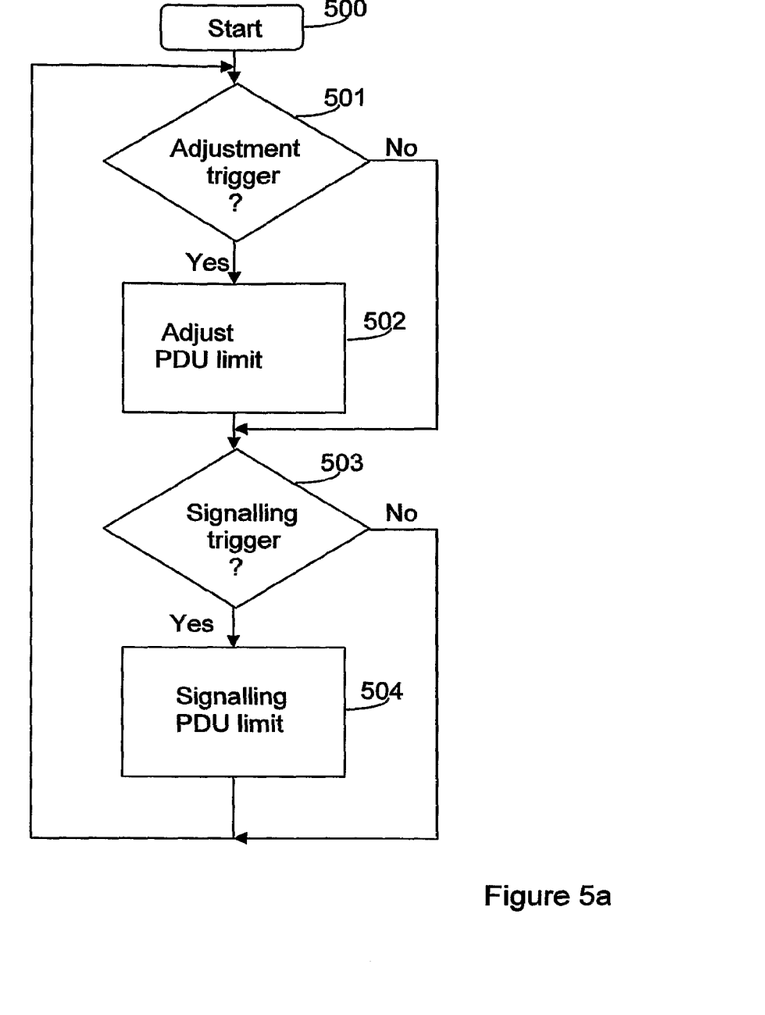
FIG. 5a is a flow chart illustrating a procedure for adjusting a PDU size limit in a lower protocol layer in accordance with another embodiment.

One embodiment for adjusting a PDU size limit in a lower protocol layer and for signaling the PDU size limit to the respective higher protocol layer will now be described with reference to FIG. 5a. The procedure, starting in step 500, may be executed periodically as long as a segmentation limit according to the claimed invention is deployed. In step 501 it is determined if a predetermined condition for adjusting the PDU size limit has been triggered. Upon detecting that a condition for adjusting the PDU size limit has occurred, the PDU size limit is adjusted according to a predetermined rule. In a next step 503 it is determined if a predetermined condition for signaling the PDU size limit to a respective upper-layer protocol has occurred. If a signaling is triggered, the recently updated PDU size limit is signaled to the respective higher protocol layer in a final step 504, where the indication, comprising the PDU size limit will trigger an adjusting procedure, adapted to adjust the segmentation limit, as described above.

Figure 5B:
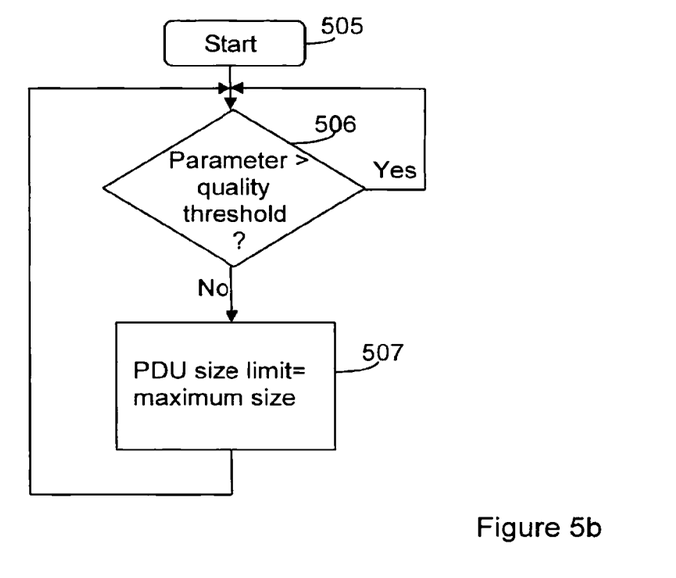
FIG. 5b is a flow chart illustrating a procedure for adjusting a PDU size limit in a lower protocol layer in accordance with yet another embodiment.

The conditions for adjusting the PDU size limit may be defined according to different preferred criteria. According to one embodiment, a parameter, such as largest unblocked transport block, largest available transport block, link quality, available scheduling grants or available resources may be monitored periodically, or according to any other predetermined rule. Available resources may comprise resources such as transmission power, frequency resources or time-slots. FIG. 5b illustrates a way of triggering an adjustment which has the purpose of cancelling the segmentation limit when a quality parameter, which is monitored in the lower protocol layer, indicates such a high quality that the use of a flexible segmentation is found superfluous. Such a monitoring is done in step 506 in the figure. In step 507, PDU size limit is set to a predefined, high value, hereby denoted maximum size.

By setting PDU size limit to maximum limit, the segmentation limit will be adjusted to a value high enough to allow all possible SDUs to fit into the segmentation limit. Since all SDUs will now fit into the segmentation limit, segmentation practically will be cancelled until the segmentation limit is updated with a lower value.

Also the conditions for triggering the signaling of the latest updated PDU size limit may be set according to different preferences. According to one embodiment, indications are configured to be signaled on a periodical basis. In another embodiment an indication is configured to be signaled when PDU size limit is found to be lower than a pre-defined updating threshold. In yet another embodiment an indication is instead signaled when it is found that PDU size limit has been changed above a certain configurable amount, in order to reduce the amount of indication messages, sent from the lower protocol layer to the respective higher protocol layer. The proposed alternative adjustment trigger conditions, as well as the alternative signaling trigger conditions mentioned above, may be implemented alone or in any alternative combination.

The proposed indication may be used also for forwarding additional instructions in connection with the proposed adjusting procedure. According to one embodiment, the indication also includes a request for re-segmentation from the respective higher protocol layer. Such a request may comprise an explicit indication of all PDUs to be re-segmented. Alternatively, a request may comprise the last successfully transmitted PDU. Such a request may result in that all subsequent PDUs are re-segmented by the respective higher protocol layer. In yet another embodiment the indication may comprise a request to the respective higher protocol layer to discard a number of SDUs, when it is found that the lower protocol layer has failed to transmit the respective SDUs, due to excessive size. Another condition for requesting for discarding of SDUs may be if it has been estimated that a number of SDUs cannot be successfully transmitted within a predetermined time-limit.

Figure 6:
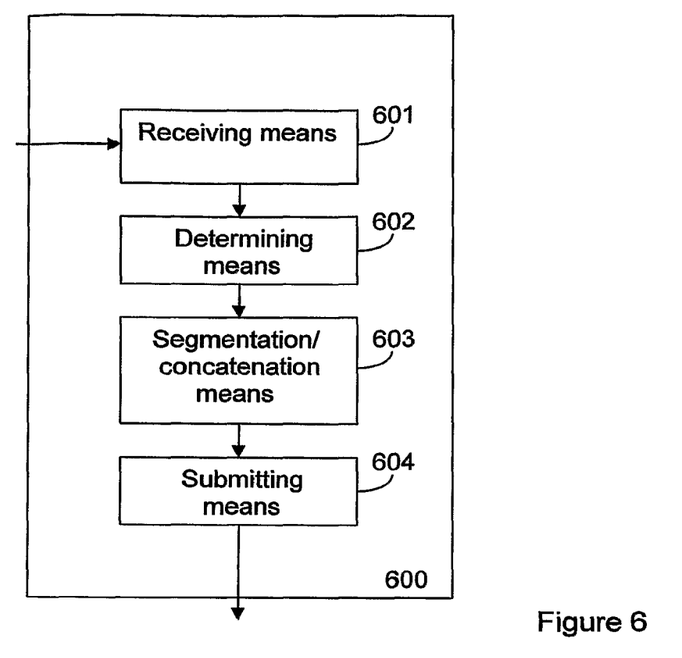
FIG. 6 is a schematic illustration of a node, having a higher protocol layer, responsible for performing adaptive segmentation and/or concatenation, in accordance with another embodiment.

The functionality in a node suitable for performing segmentation and/or concatenation according to one embodiment will now be schematically described with reference to FIG. 6. It is to be noted that this node 600 could be any type of communication node which is adapted to perform segmentation and/or concatenation. An SDU received in a receiving means 601 is forwarded to a determining means 602 for determining whether segmentation and/or concatenation is to be executed. The determining means comprises means for deploying a segmentation limit according to any of the embodiments proposed above, and means for determining if a received SDU fit into the segmentation limit or not. Next, the SDU is passed to a segmentation and concatenation means 603, where the SDU is segmented and/or concatenated according to any of the embodiments proposed above if the SDU if found not to fit into the segmentation limit by the determining means. The resulting PDUs are then submitted to a respective lower protocol layer by a submitting means 604. If, however, the SDU if found to fit into the segmentation limit, the resulting on or more PDUs are submitted to a respective lower protocol layer by the submitting means according to conventional procedures.

Figure 7:
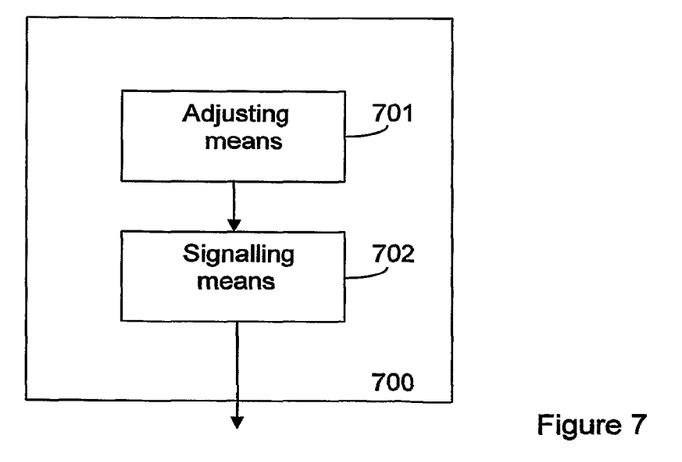
FIG. 7 is a schematic illustration of a node having a lower protocol layer, adapted to receive adaptively segmented and/or concatenated PDUs from a higher protocol layer, according to another embodiment.

According to the different proposed embodiments of the claimed invention, a PDU size limit is updated and signaled in a lower protocol layer, adapted to receive PDUs, submitted from a higher protocol layer. FIG. 7 schematically illustrates the functionality necessary for providing such a service to the higher protocol layer. The node 700 comprises an adjusting means adapted to adjust a PDU size limit when an adjustment trigger has been activated. The latest updated PDU size limit is signaled to the respective higher protocol layer from a signaling means 702 when a signaling trigger has been activated. The signaling means also may comprise means adapted to determine which PDUs that have been successfully transmitted, and means adapted to include a request to discard a number of SDUs, when it has been determined that transmitting of these SDUs has failed due to excessive size.

This means also may be adapted to use an estimating scheme for estimating whether a number of SDUs can be transmitted successfully within a predetermined time-limit or not. Also the result from this estimation may be used for requesting for a number of SDUs to be discarded in the higher protocol layer.

While the present disclosure has been described with reference to specific exemplary embodiments, the description is generally only intended to illustrate the inventive concept and should not be taken as limiting the scope of the present disclosure, which is defined by the appended claims.

What is claimed is:

1. A method of providing adaptive segmentation in a higher protocol layer interacting with a lower protocol layer, comprising:
    deploying an adaptable segmentation limit at the higher protocol layer which defines a threshold of a largest Protocol Data Unit (PDU) to be submitted to the lower protocol layer, wherein a PDU to be submitted to the lower protocol layer may match any transport block size that is available in the lower protocol layer;
    determining, at the higher protocol layer and for each arriving Service Data Unit (SDU), whether the SDU can fit into the segmentation limit;
    segmenting, at the higher protocol layer, each SDU that does not fit into the segmentation limit into PDUs which are smaller than or equal to the segmentation limit, and performing no segmentation on each SDU that fits into the segmentation limit, such that arbitrary PDU sizes are used that are smaller than or equal to the segmentation limit; and
    submitting the resulting one or more PDUs to the lower protocol layer.

2. The method of claim 1 wherein the segmenting further comprises:
    concatenating remaining SDUs into a PDU which fits into the segmentation limit, after having segmented one or more SDUs; or
    if no segmentation is being performed, concatenating two or more SDUs into a PDU until the segmentation limit is reached.

3. The method of claim 1 wherein the deploying comprises dynamically adapting the segmentation limit based on an indication signaled from the lower protocol layer.

4. The method of claim 3 wherein the indication includes a notification of a PDU size limit defining the largest PDU size which is accepted by the lower protocol layer.

5. The method of claim 1 wherein the segmentation limit is adjusted based on an observation of residual loss rate in the higher protocol layer.

6. The method of claim 5 wherein the residual loss rate is monitored periodically in the higher protocol layer.

7. The method of claim 5:
    wherein, upon observing that the residual loss rate is above a predetermined loss rate threshold, the segmentation limit is adjusted by lowering the segmentation limit by a predetermined decreasing amount; and
    wherein, upon observing that the residual loss rate is below the loss rate threshold, the segmentation limit is adjusted by increasing the segmentation limit by a predetermined increasing amount.

8. The method of claim 1 wherein the higher protocol layer is a Radio Link Control (RLC) protocol layer.

9. The method of claim 1 wherein the higher protocol layer is located in a Radio Network Controller (RNC) or in a user equipment.

10. The method of claim 1 wherein the lower protocol layer is a Medium Access Control (MAC) protocol layer.

11. The method of claim 1 wherein the lower protocol layer is located in any of a Node B, a Radio Network Controller (RNC), or a user equipment.

12. The method of claim 1 wherein the higher protocol layer and the lower protocol layer are located in different nodes.

13. A node in a communication network, the node being operative to provide adaptive segmentation in a higher protocol layer interacting with a lower protocol layer, the node comprising one or more processing circuits configured to:
    deploy an adaptable segmentation limit at the higher protocol layer that defines a threshold of a largest PDU to be submitted to a lower protocol layer, wherein a Protocol Data Unit (PDU) to be submitted to the lower protocol layer may match any transport block size that is available in the lower protocol layer;
    receive one or more SDUs in the higher protocol layer;
    determine, for each SDU, whether the SDU can fit into the segmentation limit;
    segment an SDU that does not fit into the segmentation limit into PDUs which are smaller than or equal to the segmentation limit, and perform no segmentation on an SDU that fits into the segmentation limit, such that arbitrary PDU sizes are used that are smaller than or equal to the segmentation limit; and submit the resulting one or more PDUs to the lower protocol layer.

14. The node of claim 13 wherein the one or more processing circuits are configured to segment the SDU by being configured to:

concatenate remaining SDUs into a PDU, which fits into the segmentation limit, after having segmented one or more SDUs; or if no segmentation is being performed, concatenate two or more SDUs into a PDU until the segmentation limit is reached.

15. The node of claim 13 wherein the one or more processing circuits are further configured to change the segmentation limit with a configurable amount based on an indication signaled from the lower protocol layer.

16. The node of claim 15 wherein the indication includes a notification of a PDU size limit, defining the largest PDU size which is accepted by the lower protocol layer.

17. The node of claim 13 wherein the one or more processing circuits are further configured to adaptively adjust the segmentation limit based on an observation of residual loss rate in the higher protocol layer.

18. The node of claim 17 wherein the one or more processing circuits are further configured to monitor the residual loss rate periodically.

19. The node of claim 17 wherein the one or more processing circuits are configured to adjust the segmentation limit by being configured to:

lower the segmentation limit by a predetermined decreasing amount if the residual loss rate is found to be above a predetermined loss rate threshold; and increase the segmentation limit by a predetermined increasing amount if the residual loss rate is found to be below the loss rate threshold.

20. The node of claim 13 wherein the higher protocol layer is a Radio Link Control (RLC) protocol layer.

21. The node of claim 13 wherein the node is any of a Radio Network Controller (RNC), a Node B or a user equipment.

22. The node of claim 13 wherein the lower protocol layer is a Medium Access Control (MAC) protocol layer.

* * * * *

UNITED STATES PATENT AND TRADEMARK OFFICE
CERTIFICATE OF CORRECTION

| | | |
|---|---|---|
| PATENT NO. | : 9,166,733 B2 | Page 1 of 1 |
| APPLICATION NO. | : 14/509359 | |
| DATED | : October 20, 2015 | |
| INVENTOR(S) | : Torsner et al. | |

It is certified that error appears in the above-identified patent and that said Letters Patent is hereby corrected as shown below:

In the drawings,

In Fig. 1, Sheet 1 of 6, delete "RNC 110" and insert -- SRNC 110 --, therefor.

In the specification,

In Column 1, Line 6, delete "2012," and insert -- 2012, now Pat. No. 8,964,784, --, therefor.

In Column 1, Line 7, delete "2008," and insert -- 2008, now Pat. No. 8,331,403, --, therefor.

In Column 2, Line 45, delete "PCU" and insert -- PDU --, therefor.

Signed and Sealed this
Fifth Day of April, 2016

Michelle K. Lee
*Director of the United States Patent and Trademark Office*